Figure 1:
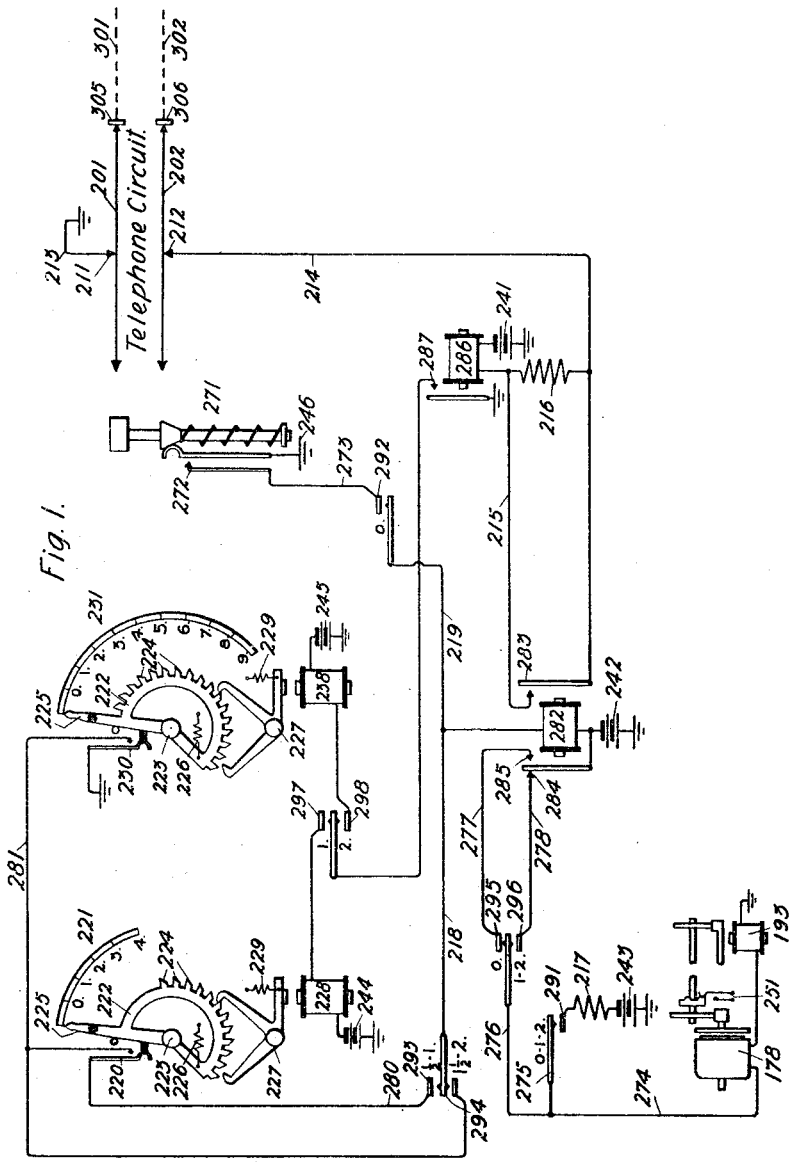

E. B. CRAFT.
SELECTIVE SWITCHING APPARATUS.
APPLICATION FILED AUG. 10, 1912.

1,117,553.

Patented Nov. 17, 1914.
7 SHEETS—SHEET 1.

Witnesses:
R. O. Hinkle.
O. D. M. Guthe

Inventor:
Edward B. Craft.
by John G. Roberts
Atty.

E. B. CRAFT.
SELECTIVE SWITCHING APPARATUS.
APPLICATION FILED AUG. 10, 1912.

1,117,553.

Patented Nov. 17, 1914.
7 SHEETS—SHEET 2.

Witnesses:
R. O. Hinkle.
O. D. M. Cuthle.

Inventor:
Edward B Craft.
by John G. Roberts,
Att'y.

E. B. CRAFT.
SELECTIVE SWITCHING APPARATUS.
APPLICATION FILED AUG. 10, 1912.

1,117,553.

Patented Nov. 17, 1914.
7 SHEETS—SHEET 3.

Witnesses:

Inventor:
Edward B. Craft.
by John G. Roberts
Att'y.

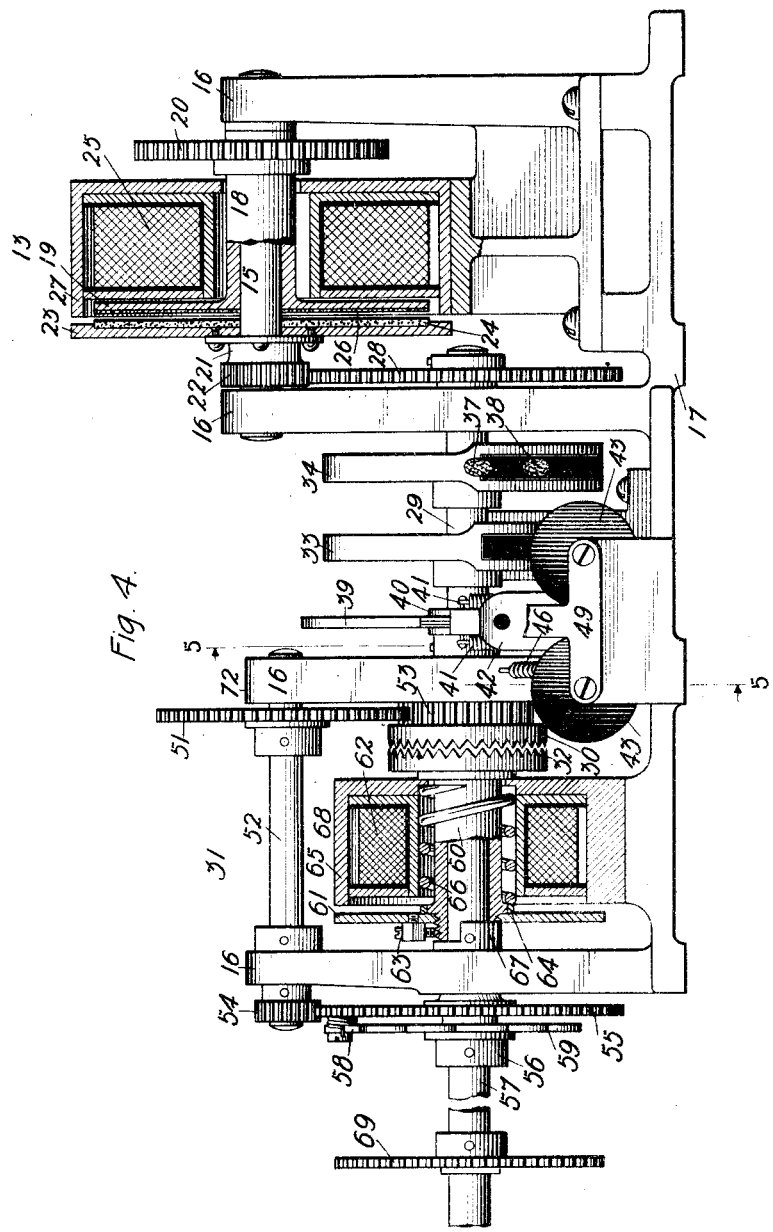

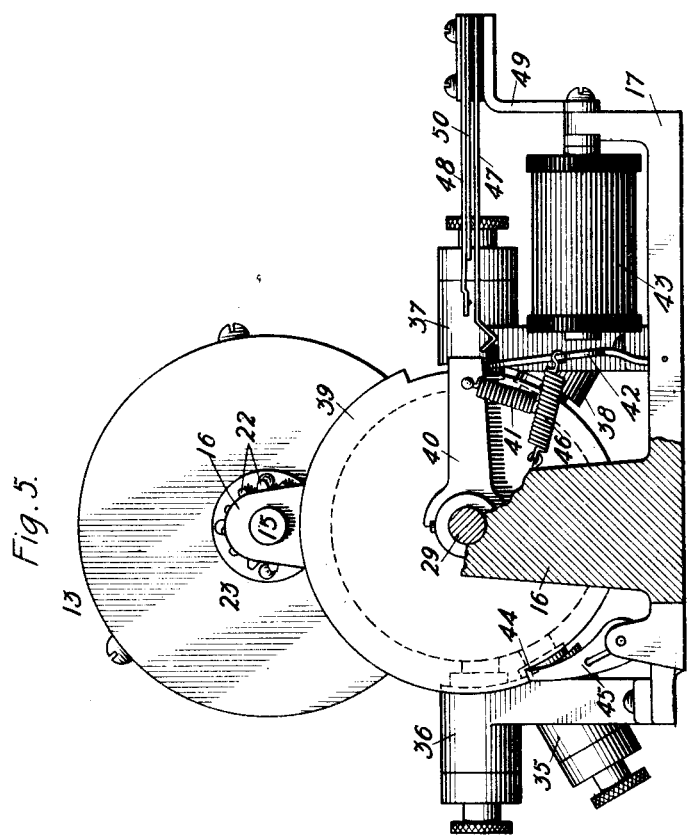

E. B. CRAFT.
SELECTIVE SWITCHING APPARATUS.
APPLICATION FILED AUG. 10, 1912.
1,117,553.
Patented Nov. 17, 1914.
7 SHEETS—SHEET 6.
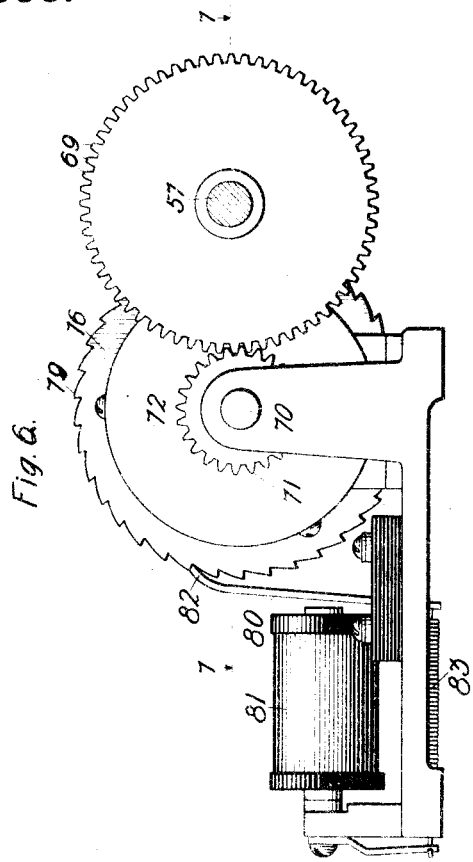
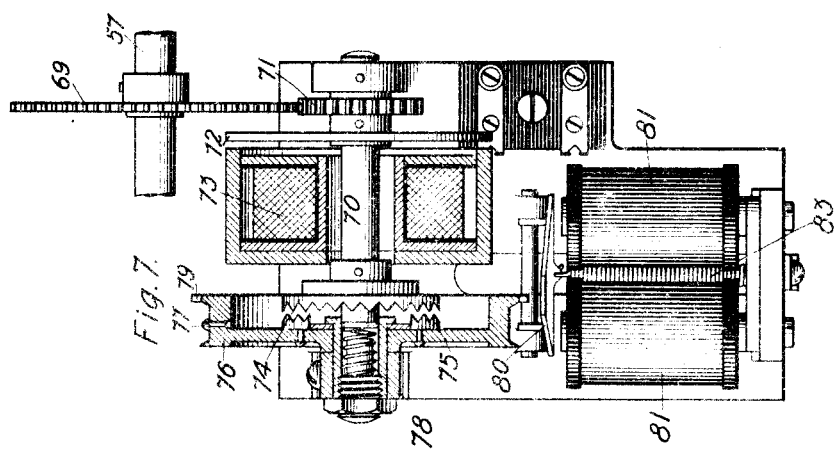
Witnesses:
R. A. Hinkle.
O. D. M. Guthe.
Inventor:
Edward B. Craft.
by John G. Roberts,
Atty.

E. B. CRAFT.
SELECTIVE SWITCHING APPARATUS.
APPLICATION FILED AUG. 10, 1912.
1,117,553.
Patented Nov. 17, 1914.
7 SHEETS—SHEET 7.
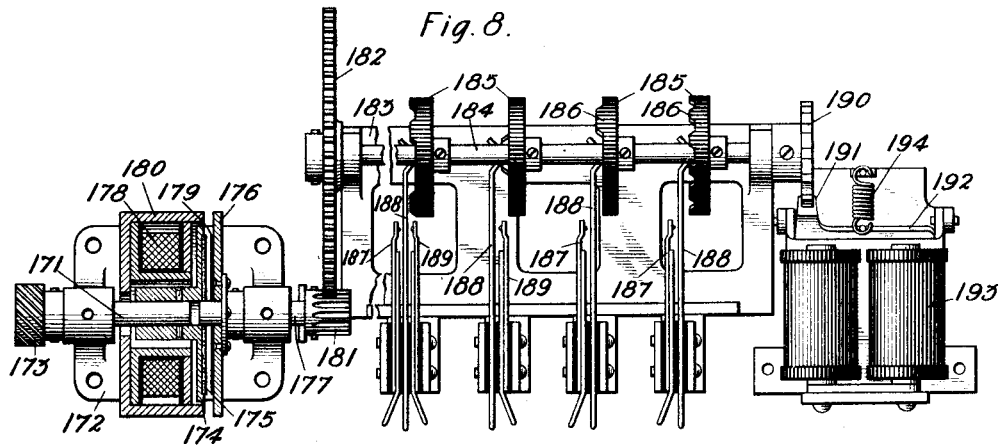
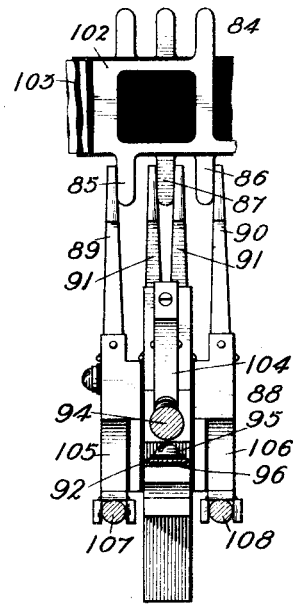
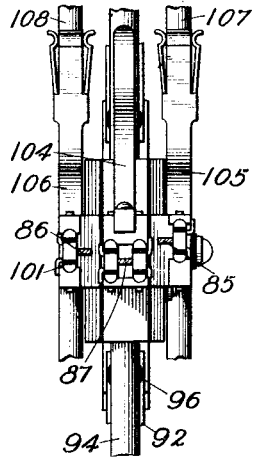
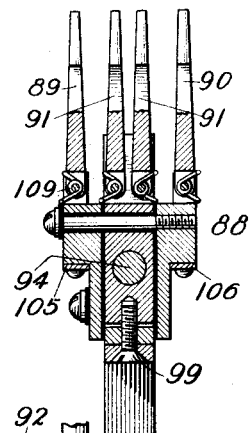
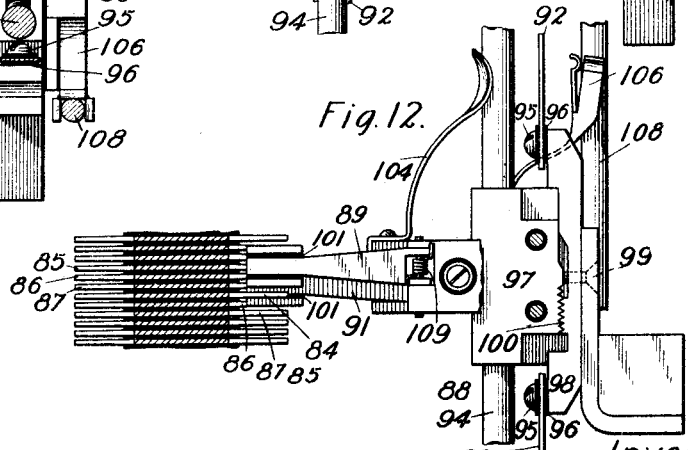
Witnesses:
R. O. Hinkle
O. B. M. Guthe
Inventor:
Edward B. Craft.
by John G. Roberts
Atty.

UNITED STATES PATENT OFFICE.

EDWARD B. CRAFT, OF HACKENSACK, NEW JERSEY, ASSIGNOR TO WESTERN ELECTRIC COMPANY, OF NEW YORK, N. Y., A CORPORATION OF ILLINOIS.

SELECTIVE SWITCHING APPARATUS.

1,117,553.   Specification of Letters Patent.   Patented Nov. 17, 1914.

Application filed August 10, 1912. Serial No. 714,387.

*To all whom it may concern:*

Be it known that I, EDWARD B. CRAFT, a citizen of the United States, residing at Hackensack, in the county of Bergen and State of New Jersey, have invented a certain new and useful Improvement in Selective Switching Apparatus, of which the following is a full, clear, concise, and exact description.

This invention relates to telephone exchange systems of the automatic or semi-automatic type in which the selection of lines or trunks for the extension of telephone transmission circuits is accomplished by mechanical selector switches, the object being to provide an improved arrangement of circuits and apparatus whereby the selective operations may be accurately and speedily accomplished.

An object of this invention is the provision of simple, efficient and economical means for selecting an idle line and for completing connection to such selected line, and comprises means whereby a plurality of selector switches may be driven from a common source of power, the application of power for driving any given switch being under the joint control of an electromagnetic mechanism common to a group of selectors, both of such mechanisms being controlled by a sender device over a trunk or connecting circuit to which such switch is connected.

Another object of this invention is to provide, in an automatic or semi-automatic telephone system in which the selector switches are arranged in groups, a driving mechanism by which selection is accomplished, said driving mechanism being controlled by mechanisms individual to each selector switch and also by a mechanism common to the group of selector switches.

A feature of this invention involves the provision of means whereby the selection of a main group of terminals may be accomplished at a high speed, after which further selection may take place at a lower speed, the selector switch being driven from a single source of power, and under the control of a distant sender or controlling mechanism.

In a system involving such features, particularly where the selector switches used are of the clutch controlled type, the transition from one selection to the next should be accomplished without the release of the selector switch, and this invention, therefore, provides means in connection with a sender device having a plurality of controller mechanisms, whereby the selection governed by one controller mechanism may be completed and the selection governed by another controller mechanism instituted without the release of the selector controlling clutch, and without the release of the selector mechanism.

Figure 2:
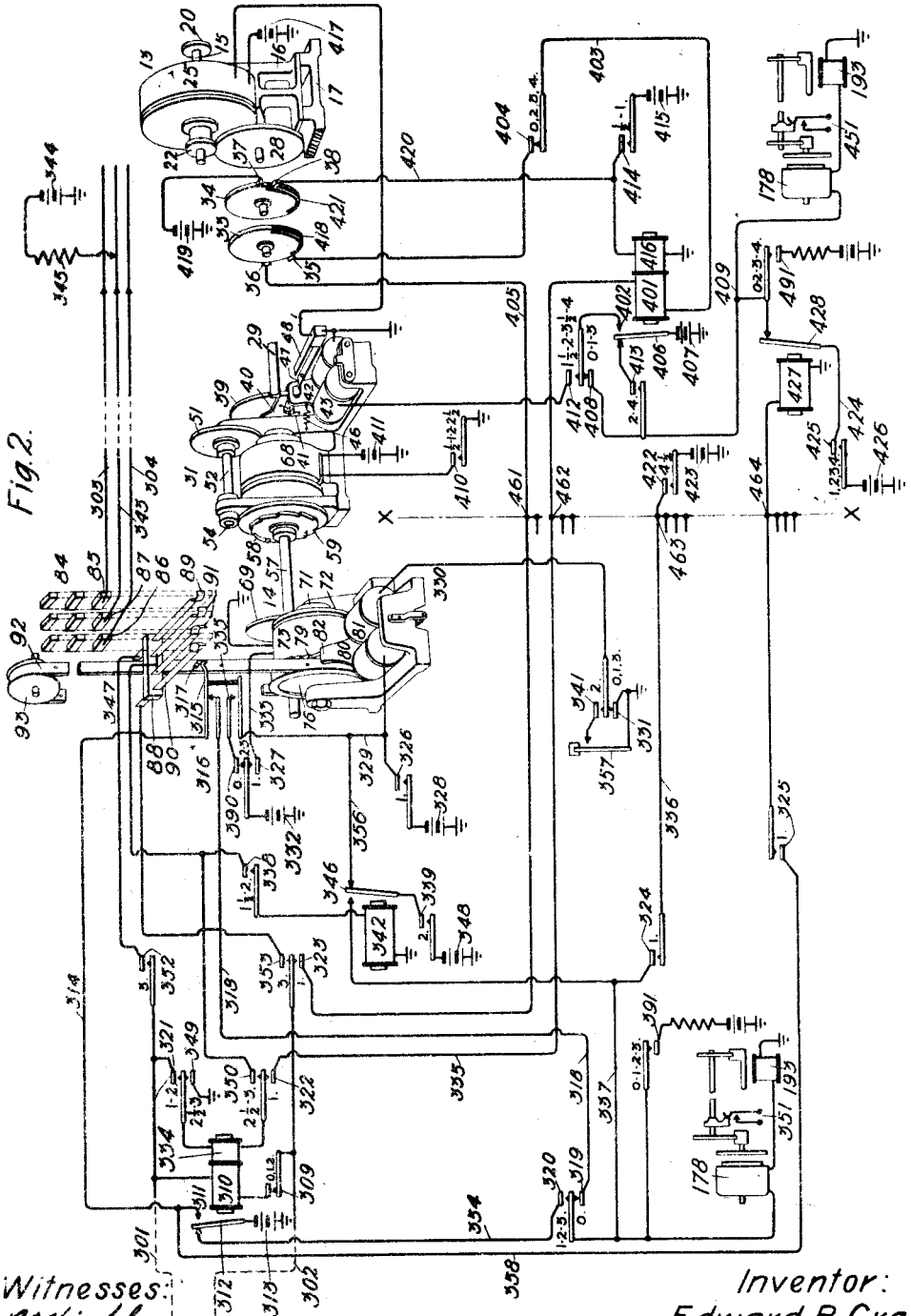
Figure 3:
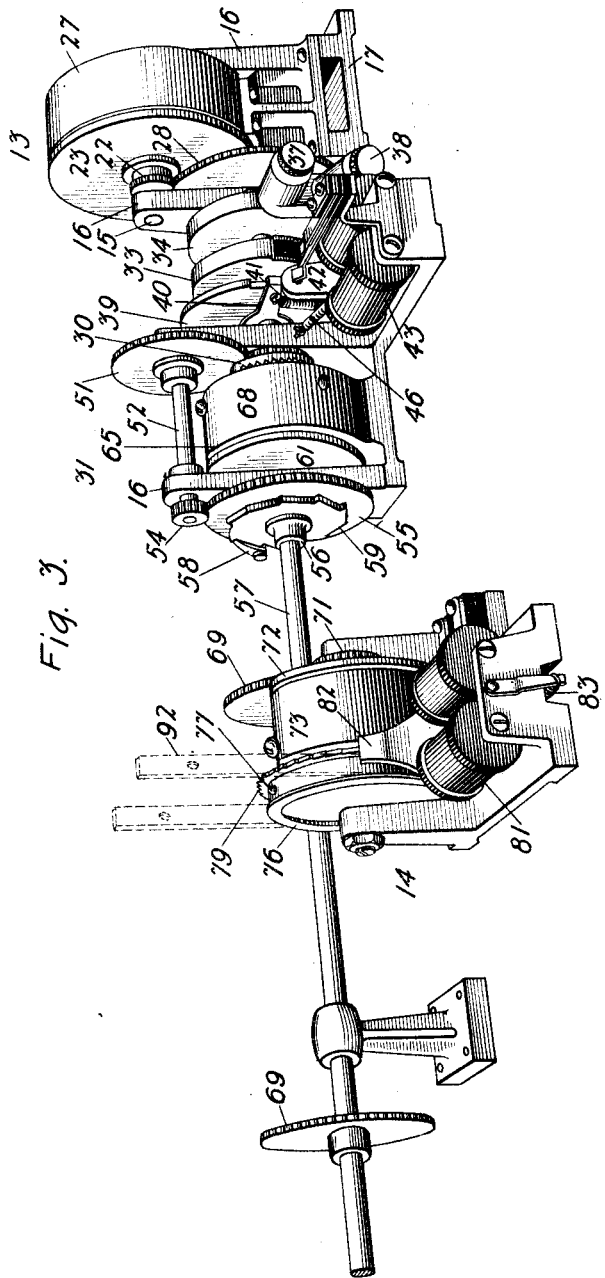

In the drawings: Figures 1 and 2 illustrate the invention in connection with a single selector and a sender, the selector being one by which it is desired to select an idle trunk line to a further selector. Fig. 3 is a perspective view of the selector including the master driving mechanism with the speed changing clutch and gearing which is common to a plurality of selectors. There is also shown in this figure one of the individual mechanisms of this group of the selectors. All of this apparatus is shown diagrammatically in Fig. 2. Fig. 4 is a longitudinal vertical section of so much of the driving mechanism as is common to a plurality of selectors belonging to a particular group. Fig. 5 is a transverse vertical section of the common driving mechanism taken on the line 5—5 of Fig. 4. Fig. 6 is a side view of the driving, holding and release mechanism individual to each individual selector. Fig. 7 is a horizontal section of the individual driving and release mechanism taken on the line 7—7 of Fig. 6. Fig. 8 is a plan view of a sequence switch as used in connection with the sender and driving mechanisms shown in Figs. 1 and 2. Figs. 9, 10, 11 and 12 are detail views of the brush carrier used in the selector shown in Fig. 2.

*The selector.*—The selecting mechanism in connection with which this invention is illustrated is shown partly diagrammatically and partly in perspective in Fig. 2. It is of the master and individual type of mechanism, arranged to be operated on what is known as the panel form of selector multiple. This multiple consists preferably of strips of metal having contact points spaced at regular intervals along their entire length. These strips are placed one upon another with strips of insulating material between, in such manner as to form vertical banks of contacts over which the selector contact brushes can be moved in a vertical direction, each vertical bank of contacts forming the coöperating terminals of a separate selector. The selector may comprise any desired number of sets of contacts and these contacts may be divided and subdivided into groups as preferred. As herein described, however, the selector is considered as accommodating contacts forming the terminals of five hundred trunk lines, these five hundred trunk lines being divided into five main groups of one hundred lines and each of these main groups subdivided into ten subordinate groups of ten lines each. The ten trunk lines, the terminals of which form a subordinate group, are herein considered as leading to apparatus having similar functions so that each of the lines of a subordinate group will equally well serve for the connection desired, but it should be understood that this invention as herein involved is not limited to such construction.

In Fig. 2 a part of a bank of contacts as referred to above is indicated generally at 84. The set of contacts 85, 86 and 87 form respectively the transmission and test terminals of the trunk line 303, 304 to a further selector. The brush carrier 88 carries the brushes 89 and 90 arranged to contact, respectively, with the terminals 85 and 86, and the brushes 91 arranged to contact with the test terminal 87. This brush carrier, which is shown in detail in Figs. 9, 10, 11 and 12 and will be hereinafter more specifically described, is carried by a metallic tape 92 passing around the sheave 76 of the driving mechanism individual to the selector and also over the pulley 93. This tape when moved by the rotation of the sheave 76 carries the brushes into position to make contact with the terminals 85, 86 and 87 of the desired trunk line, the selection being determined by the extent of the movement of the tape, the control of which will be hereinafter fully set forth.

Briefly considered, selection is accomplished by moving the brush carrier, which normally stands at the bottom of the first main group of contact terminals, first by long steps and at a relatively high speed to the bottom of the main group of contacts in which the terminals of the desired line are located; and thereafter moving the brush carrier by shorter steps and at a relatively low speed to the top of the subsidiary group in the selected main group, in which the terminals of the desired line are located. The main and subsidiary group having thus been selected the particular set of terminals in such subsidiary group is selected by a downward step by step movement of the brush carrier, which downward movement may be under the control of a sender or may be an automatic search for an idle line as is herein illustrated.

As shown in Figs. 9 to 12 the brushes 89, 90 and 91 are supported on a carriage 88 slidably mounted upon a rod 94 which extends the entire height of the selector. This carriage 88 is securely attached to the metallic tape 92 by the screws 95, but is insulated therefrom by the insulating bushings 96. The carriage itself is composed of two body portions 97 and 98 in order to render possible the accurate adjustment of the brushes with relation to the terminals and to the tape 92. This construction is shown clearly in Fig. 12, wherein the tape 92 is shown attached to the part 98 and the brushes are carried by the part 97, the two parts being securely fastened together by means of the bolt 99 while the coöperating serrations 100 upon the parts 97 and 98 serve to prevent their disadjustment after they have been once secured. The brushes 89, 90 and 91 are so arranged, as will appear from Fig. 12, that they make mechanical contact with one terminal before leaving the preceding one, but owing to the inserts of insulation 101 upon their contact faces, do not make electrical contact with more than one terminal at a time. These brushes moreover are arranged out of alinement with each other in order to bring them into proper relation with the set of terminals 85, 86, 87 which are arranged as will be seen from Figs. 9, 10 and 12 in staggered relation, the lower-most being terminal 87 and the upper-most being terminal 85. This relation of the terminals is necessary owing to the construction indicated in Fig. 9, where it may be seen that such terminals are formed by projections upon the conducting pieces 102 laid between sheets of insulation 103 as is usual in the construction of selectors of what is known as the panel type. The brushes 89, 90 and 91 are pivotally mounted upon the carriage 88 as will be readily seen and are pressed into contact with the terminals 85, 86 and 87 by the springs 109. The brushes 91 are in electrical connection through their mounting with the contact spring 104, which spring makes contact at all times with the rod upon which the carriage moves, and thereby places the brushes 91 in electrical contact with the rod 94 with which the selector test lead is electrically connected. The brushes 89 and 90 are each mounted upon a portion of the carriage insulated from each other and from the portion on which the brushes 91 are mounted and each in turn is electrically connected by means of the contact springs 105 and 106 with the auxiliary rods 107 and 108 which also extend the full height of the selector and serve to connect the transmission circuit to the brushes 89 and 90.

The driving mechanism by which power is supplied for moving the brush carrier 88 into contactual relation with the terminals 85, 86 and 87 is shown in Fig. 2 by the master clutch mechanism 13, common to a plurality of selectors; the individual clutch mechanism 14 and the speed changing mechanism 31 which is also common to a plurality of selectors as indicated on Fig. 3. The master clutch 13 comprises a shaft 15 mounted upon the uprights 16 extending from the base 17 and has in turn rotatably mounted thereon a sleeve 18, at one end of which is the disk 19 and to the other end of which is attached the gearwheel 20. This gearwheel 20 is in permanent mesh with another gearwheel (not shown) upon a constantly rotating shaft, which may be, and is preferably, that which furnishes power to the various apparatus of the exchange. Upon the shaft 15 is also mounted the sleeve 21 to one end of which is attached the gearwheel 22 and to the other end of which is attached the disk 23. The disk 23, of soft iron or other magnetic material, forms the armature of the electromagnet 25 mounted upon the base 17 and surrounding the shaft 15 and the sleeve 18. The disk 19, which is formed of brass or other non-magnetic material, is provided with a friction surface 26 arranged to oppose and coöperate with the friction surface 24 upon the central portion of the disk or armature 23. The circular pole-piece 27 surrounds the disk 19 and when the electromagnet 25 is energized it attracts the disk 23 which moves freely upon the shaft 15 and brings the disks 19 and 23 into intimate frictional contact, causing the rotation of the disk 23. The arrangement of the disks 19 and 23 with respect to the pole-piece 27 is such that when the disk 23 is attracted, its periphery will be closely adjacent to the pole-piece 27, in order that it may be firmly held in contact with the disk 19, but will not be in actual contact with the pole-piece itself. The gearwheel 22 meshes with the gearwheel 28 fixed upon the shaft 29, also mounted upon the uprights 16. This shaft 29 has attached to one end a clutch member 30 arranged to coöperate with a second clutch member 32 of the speed reducing mechanism 31. Upon the shaft 29 are also mounted the commutators 33 and 34. The commutator 33 coöperates with the contacts 35, 36 and serves to make and break the circuit between these contacts once for every revolution of the shaft 29. The commutator 34 similarly coöperates with the contacts 37 and 38 to make and also break the circuit between these contacts at each revolution of the shaft. The relation of the make and break of the circuits between contacts 35 and 36, 37 and 38, respectively, will be hereinafter referred to and set forth in the description of the operation of the system.

The disk 39, which is also mounted on the shaft 29, has coöperating therewith the arm 40 mounted upon the shaft 29 and held in particular relation to the disk 39 by the springs 41, which are fastened at their respective ends to the disk and the arm. This arm 40 coöperates with the armature 42 of the stop magnet 43 to stop the rotation of the disk 39 when the magnet 43 has been deënergized, but to permit a slight over-run by the disk 39 due to the extension of the springs 41, which over-run will, however, be corrected and the disk 39 brought back into proper position by the contraction of the springs 41.

Coöperating with a notch 44 upon the disk 39 is a pawl 45 mounted upon the base 17 and so arranged that upon the reverse movement of the disk 39, due to the contraction of the springs 41, the disk 39 may not by any mischance move too far in the reverse direction. By means of the arm 40 and the pawl 45 the disk 39 when stopped by the armature 43 will always come to rest in precisely the same position. The armature 42, which is normally in a retracted position, due to the tension of the retracting spring 46, operates when attracted for purposes hereinafter set forth to close the contacts 47 and 48, which are mounted upon an extension 49 from the base 17 insulated from each other and from the extension 49.

The speed changing mechanism 31 comprises the gearwheel 51 affixed to the shaft 52, mounted upon the uprights 16, which gearwheel 51 meshes with the gearwheel 53 upon the shaft 29. Also affixed to the shaft 52 is a gearwheel 54 which meshes with the gearwheel 55 affixed to a sleeve 56 mounted, but freely rotatable, upon the shaft 57. This gearwheel 55 carries a pawl 58 coöperating with the ratchet wheel 59 affixed to the shaft 57.

Upon the end of the shaft 57 is mounted the sleeve 60 longitudinally movable upon said shaft 57. To one end of the sleeve 60 is attached the clutch member 32 coöperating with the clutch member 30 upon the shaft 29, and upon the other end is adjustably mounted the disk 61 forming the armature of the electromagnet 62 which surrounds the shaft 57 and the sleeve 60. The adjustable mounting of the disk 61 comprises the threaded portion of the sleeve 60, the set screw 63 and the adjusting ring 64. By this means the disk 61 may be so positioned that upon the energization of the electromagnet 62 it will be brought closely adjacent to the circular pole-piece 65 of the electromagnet, thereby forcing the clutch member 32 into coöperative relation with the clutch member 30, but will not actually come in contact with the pole-piece 65. Upon the deënergization of the magnet 62 the disk 61 will be moved away from the pole-piece 65 and the clutch member 32 out of coöperative relation with the clutch member 30 by the action of the spring 66. This spring 66 has one end abutting against a portion of the electromagnet 62, and the other end against the adjusting ring 64 in such a manner as to move the sleeve 60 longitudinally upon the shaft when the electromagnet 62 is deënergized. A portion of the sleeve 60 extends longitudinally of the shaft 57 and is keyed into a recessed portion of the collar 67 fastened to the shaft 57. By this means the sleeve 60, although longitudinally movable upon the shaft 57, is not able to rotate without rotating the shaft 57 correspondingly. It will, therefore, be seen that the operation of the clutch 13 by the energization of the electromagnet 25 will cause the shaft 57 to revolve as the shaft 29 revolves, either through the reducing gearing 53, 51, 54, 55 and the pawl and ratchet 58, 59, or directly through the clutch members 30, 32 depending upon the operative condition of the speed changing clutch 68. The gearing referred to, and which will be called the "speed reducing gearing," is so constructed that when the speed changing clutch 68 is not operated the shaft 57 will revolve but one-tenth as fast as the shaft 29. The shaft 57 will, however, revolve at the same speed as the shaft 29 when the speed changing clutch 68 is operated. Upon the shaft 57 are fixed at proper intervals, as shown on Fig. 3, the gearwheels 69 which transmit power to the individual clutch mechanisms 14, but one of which is shown, however, in this figure.

*Individual driving mechanism.*—The individual driving mechanism comprises the shaft 70 to one end of which is affixed the gearwheel 71 which meshes with the gearwheel 69, above referred to, upon the main driving shaft 57. Adjacent to the gearwheel 71, and also affixed to the shaft 70 is the disk 72 of soft iron, or other magnetic material, which forms the armature of the electromagnet 73, which when energized attracts the disk 72 to move the shaft 70 so that the clutch member 74 fixed on the other end of the shaft is moved into coöperative relation with the clutch member 75, fastened to the sheave 76 around which the metallic tape 92 is adapted to pass. This sheave 76 has set in the periphery thereof projecting pins 77 which coöperate with the holes in the metallic tape 92 to prevent the tape slipping upon the sheave. The shaft 70 is normally held in a position in which the clutch member 74 is out of coöperative relation with the clutch member 75 by means of the spring 78, as is plainly shown on Fig. 7.

The inner rim of the sheave 76 is made to form a ratchet by having cut therein the teeth 79. Coöperating with these teeth 79 is the armature 80 of the electromagnet 81 by the energization of which the armature is adapted to be attracted to remove the projecting piece 82 upon the armature 80 out of coöperative relation with the teeth 79. The armature 80 is normally held retracted and the projecting piece held in engagement with the teeth 79 by the spring 83. The movement of the sheave 76, therefore, depends upon the energization of the clutch magnet 73 and the rotation of the shaft 57. The shaft 57, however, having moved the sheave and tape into any given position they may be prevented from returning by the projection 82 upon the armature 80 under the control of the release magnet 81.

*Sequence switch.*—To control the local circuits at the various parts of the system, which local circuits must be established in definite order at successive stages of the operation, to bring into service different devices or parts as desired, there are used automatic switching appliances which are termed "sequence switches". There is, for example, a sequence switch associated with the sender mechanism, a sequence switch associated with the master driving mechanism and a sequence switch associated with each individual driving mechanism as is indicated upon Figs. 1 and 2 of the drawings. These sequence switches each consist of a movable switch operating member, a number of circuit-changes being made in sequence as said member is moved from one position to another; an electromagnet and a constantly rotating source of power, the connection of which with the movable member is controlled by said magnet for advancing said movable member. In each position to which the movable member of the sequence switch is advanced a set of circuits is established by which a given operation of the device under control is made possible, and at the same time another circuit is established whereby the controlling magnet of the sequence switch may be actuated, so that the sequence switch will then be automatically advanced to the next position in which a new set of circuits is established in order to bring about a new operation or electrical condition of the device or devices under control and so on.

In the form of sequence switch mechanism shown in Fig. 8, and diagrammatically shown on Figs. 1 and 2, 173 is a gearwheel driven by a constantly rotating shaft, not shown. This gearwheel 173 is fixed upon a shaft 171 mounted upon a base 172 and having at the end opposite the gearwheel 173, a disk 174 of brass or other non-magnetic material. Adjacent to the disk 174 is a disk 176 fixed on the shaft 177 and forming the armature of the clutch magnet 178. This disk 176 is formed of soft iron or other magnetic material and has on the face thereof adjacent to the disk 174 a friction surface of suitable material 179 coöperating with a similar friction surface 175 upon the disk 174. Upon the energization of the electromagnet 178 the disk 176 will be drawn adjacent to the circular pole-piece 180 of the electromagnet, and will be brought into intimate frictional contact with the disk 174 which is constantly rotating and the two disks will, therefore, rotate together. Upon the shaft 177 is also fixed a gearwheel 181 which meshes with the gearwheel 182 fixed on a shaft 184 which is mounted on a base 183. On this shaft 184 are fixed the cam wheels 185 made of insulation, upon the outer rim of which are formed the cam surfaces 186 which coöperate with the contact springs 188 to force such springs into and out of contactual relation with the various contact springs 187 and 189 as the cam wheels 185 revolve, the movement of the springs 188 depending upon the formation and position of the cam surfaces 186 upon the cam wheels.

Fastened upon one end of the shaft 184 is a stop-wheel 190 formed with notches upon its periphery in which the projection 191 upon the armature 192 of the electromagnet 193 is adapted to rest when said armature is retracted to stop the rotation of the shaft promptly and accurately when the position desired has been reached and the electromagnet 193 has been deënergized. The spring 194 serves to retract the armature 192 upon the deënergization of the electromagnet 193.

In Figs. 1 and 2 which comprise a full diagrammatic showing of the invention the switch springs of the sequence switch are not shown in their actual arrangement, but are so located as to give a clear arrangement of the circuits, the operating cam wheels not being shown. The positions of the rotary element of each sequence switch in which any of its contacts, except the respective special contacts 291, 391 and 491, are closed, are indicated by the numbers placed adjacent to such contacts; each contact being open in all positions except those indicated by such numbers. For example, the contact 413 in Fig. 2 is closed in the 2nd and 4th positions of the master sequence switch as is indicated by the numbers 2 and 4 placed adjacent thereto and is open in all other positions. In the case of the special contacts referred to the numbers are placed on the opposite side of the switch lever from the contact anvil and indicate the positions in which the contact is open, this contact being closed continuously while the rotary element of the sequence switch is in transit and between the positions indicated. In all positions the numbers of which appear adjacent to the special contacts these contacts are open to permit the respective sequence switch to come to rest in the positions so indicated.

*Sending mechanism.*—The selector shown may be controlled by sending apparatus such, for example, as that diagrammatically illustrated in Fig. 1. As shown, this apparatus comprises a plurality of controllers 221, 231; a sequence switch 251; a stepping relay 286; a cut-off relay 282 and a starting key 271. The controllers 221, 231, which may be of any preferred construction and operated by any suitable means, are for simplicity shown as comprising manually-set segments 222, mounted at 223, controlling contacts 220, 230, respectively. These segments are governed in their return to normal position, under the influence of springs 226, by the escapement pawls 227 which coöperate with the teeth 224 upon the segments 222. These pawls 227 are moved in one direction by the electromagnets 228 and 238 and in the other direction by the retracting springs 229, and are so arranged that for each oscillation of the pawls the segments 222 will be allowed to return the distance of one tooth. The controllers 221, 231 in the construction shown are set by means of the handles 225, until the pointer upon the handle is adjacent to the number of the group in which it is desired that an idle line be found, to extend the transmission circuit. In the present showing the controller 221 serves to indicate and control the selection of the main group of line in which the desired line is to be found and the controller 231 to indicate the secondary group in such main group in which such line is to be found.

*Operation.*—Figs. 1 and 2 show diagrammatically an embodiment of the invention including a sender apparatus and a trunk selector. In these figures the telephone transmission circuit 201, 202 is shown connected by some selecting means, of common or well known design, to the trunk conductors 301, 302 at the contacts 305, 306. These trunk conductors 301, 302 lead to a selecting mechanism by which such telephone transmission circuit may be extended to the conductors 303, 304 or other similar conductors.

The selector associated with the conductors 301, 302 shown in Fig. 2 is one in which it is desired to select an idle trunk of a certain group of trunks any one of which group will equally well serve the purpose of the particular connection. It should be understood, however, that the invention is not limited to selectors of this character, but may be used with equal advantage in connection with selectors in which connection is to be made with a particular line terminating in the selector.

Associated with the circuit 201, 202 by any suitable means are the leads 213, 214 of the sender apparatus. The connection of these sender leads to the circuit 201, 202 may be either permanent or temporary as may be preferred, but since this connection forms no part of this invention it is only diagrammatically indicated as at 211, 212.

Taking up now the description of the operation of the various parts shown in extending a connection through the selector shown in Fig. 2, the telephone circuit 201, 202 will be assumed to have been connected through any suitable switching means to the conductors 301, 302 through the contacts 305, 306. At this time the sender leads 213, 214 are connected at the points 211, 212 to the telephone circuit 201, 202.

In order to accomplish a further selection whereby the telephone circuit may be extended to a suitable idle trunk line through the selector shown in Fig. 2, the controllers 221, 231 are set to indicate the respective main and secondary groups in which the desired idle line is to be selected. For example, if the main group in which such line is to be selected is the fourth upon the selector the controller 221 will be moved in a clock-wise direction until the pointer upon the handle 225 is adjacent the figure 3 upon the scale, the fourth main group being characterized by the figure 3, the first main group being characterized by the figure 0. Similarly if the secondary group in which the desired line is to be selected is the third in such fourth main group the controller 221 having been properly set the controller 231 will be moved until the pointer upon the handle 225 is adjacent to the figure 2.

Both controllers having been set it now only remains for the operator to depress the starting button 271. It should be understood that this starting button, although herein shown as an independent contact device may equally well, in constructions in which this invention is involved, be represented when convenient in a contact operated by some part of the sending apparatus, moved after all of the controllers necessary for selection have been set.

The depression of the starting button 271 closes the contacts 272, which establish a circuit from the ground 246, contacts 272, conductor 273, sequence switch contacts 292, conductor 219, cut off relay 282 to the free pole of the grounded battery 242. This energizes the cut off relay 282 causing it to operate and by its front contact 285 close a circuit from battery 242, conductor 277, sequence switch contact 295, conductors 276 and 274, sender sequence switch clutch magnet 178 and stop magnet 193 to ground and back to battery. This energizes the clutch and stop magnets, withdrawing the stop and stop pawl and causes the continuously rotating shaft with which the clutch is associated to drive the switch from rest into its first position. As has been heretofore noted the special sequence switch contact 291 serves to insure the movement of the sequence switch fully to the position desired even though the original energizing circuit for the sequence switch is broken as the sequence switch commences to move, and to accomplish this purpose it closes a circuit from battery 243 through resistance 217, sequence switch 291, conductor 274, sequence switch magnets 178, 193 and ground back to battery, at all times except when the sequence switch stands in one of its designated positions.

The sender sequence switch having been moved to its first position, the sequence switch contacts 292 and 295 of the original energizing circuit have been opened and the sequence switch contacts 293 and 296 closed. As indicated by the figure ½ adjacent to the sequence switch contact 293, this contact is closed just before the opening of the contact 292 for the purpose of continuing the energization of the cut-off relay 282 over the following circuit, battery 242, relay 282, conductor 218, sequence switch contact 293, conductor 280, contacts 220 of controller 221, conductor 281, contacts 230 of controller 231 to ground and back to battery. The contacts 220 and 230 of controllers 221 and 231 it will be noted have been closed by the displacement of the controllers. The sender is now in readiness for the first or main group selection.

Prior to the energization of the relay 282 a circuit existed from the battery 241 through the relay 286, high resistance 216, sender lead 214, contact 212, conductor 202, contact 306, conductor 302, individual sequence switch contacts 309, high resistance winding 310 of the line relay 311, conductor 301, contact 305, conductor 201, contact 211, sender lead 213 and ground back to battery. The current in this circuit, however, due to the inclusion of the high resistance 216 and the fact that the winding 310 of the relay 311 is of high resistance, is insufficient to energize either the relay 286 or the relay 311. However, upon the pulling up of the armature 283 of relay 282 a shunt is closed around the high resistance 216 and sufficient current thereupon passes through the circuit traced, to energize the relay 311, although not sufficient to energize the relay 286, due to the fact that the high resistance of the winding 310 is still included in the circuit.

Upon the energization of the relay 311 the armature 312 is attracted and closes a circuit from the battery 313 through the armature 312 and its front contact conductor 314, the closed contacts 315 of the off-normal switch 316, controlled by the projection 317 upon the metallic tape 92, conductor 318, individual sequence switch contact 319, clutch magnet 178, stop magnet 193 of the individual sequence switch 351 and ground back to battery. The energization of the operating magnets 178 and 193 of the individual sequence switch 351 causes it to move from rest or zero position to its first position, the special individual sequence switch contact 391 serving as did the sender sequence switch contact 291 to insure the movement of the sequence switch 351 fully into its first position. Upon this movement of the sequence switch 351 the sequence switch contacts 319 and 390 are opened and the sequence switch contacts 320, 321, 322, 323, 324, 325, 326 and 327 are closed all for purposes which will hereinafter appear. The individual sequence switch contact 326 closes a circuit from the battery 328 through conductor 329, release magnet 81, conductor 330, individual sequence switch contact 331 and ground back to battery to energize the release magnet 81, and the contact 327 closes a circuit from battery 332 through conductor 333, individual clutch magnet 73 and ground back to battery. As long, therefore, as the individual sequence switch contacts 326 and 327 remain closed the sheave 76 of the individual driving mechanism is coupled through the individual clutch to the master driving shaft 57, and the release magnet 81 is energized to withdraw the projection 82 on the armature 81 from contact with the teeth 79.

The closure of the individual sequence switch contacts 321, 322 and 323 has closed a shunt circuit between the conductors 301 and 302 around the high resistance winding 310 of the line relay 311 which includes the winding 334 of the line relay 311 which winding is of comparatively low resistance. This shunt circuit may be traced from the conductor 301, sequence switch contact 321, winding 334 of the line relay 311, individual sequence switch contact 322, conductor 335, winding 401 of the selecting relay 402, conductor 403, master sequence switch contact 404, commutator contacts 35 36, conductor 405, individual sequence switch contact 323 to the conductor 302. The closure of this shunt circuit through the winding 334 of the line relay 311 maintains the line relay 311 energized, energizes the selecting relay 402 and allows sufficient current to pass to energize the stepping relay 286 at the sender apparatus, current for these various relays being supplied from the battery 241. The energization of the relay 402 attracts the armature 406 and closes a circuit from the battery 407 through the armature 406 and its front contact, master sequence switch contact 408, conductor 409, operating magnets 178 and 193 of the master sequence switch 451 and ground back to battery. This circuit energizes the master sequence switch magnets 178 and 193 and causes the sequence switch to move from rest or zero position a total of two steps into its second position, the special master sequence switch contact 491 in this case being closed in the first position, so that the sequence switch when once moved from rest or zero position will continue to move until it reaches its second position. In passing through its first position, however, the sequence switch contacts 404 have momentarily opened and again closed the shunt circuit above referred to, including the winding 334 of the line relay 311 and have thereby caused the deenergization and reënergization of the stepping relays 286 for purposes hereinafter described. In order to prevent the relay 402 releasing during the movement of the sequence switch from rest to position 2 when the above circuit is opened at sequence switch contact 404 the sequence switch contact 414 is closed in position 1 of the master sequence switch to close a local circuit from battery 415, contact 414, winding 416 of relay 402 and ground back to battery.

Upon the energization of the relay 286 by the closure of the shunt circuit around the high resistance winding 310 of the line relay 311 a circuit was closed from the battery 244 through the magnet 228 of the controller 221, sequence switch contact 297, armature 287 of the stepping relay 286 and ground back to battery. The closure of this circuit energized the magnet 228 which attracted its armature and moved the oscillating pawl 227 to release the segment 222 a half step. The subsequent deënergization of the stepping relay 286 due to the momentary opening of the master sequence switch contact 404 caused the deënergization of the magnet 228 due to the opening of the circuit to such magnet at the armature 287. The deënergization of the magnet 228 allows its armature to retract and the pawl 227 is again retracted under the action of the spring 229 to release the segment 222 another half step.

The master sequence switch 451 having reached its second position, the sequence switch contact 404 is again closed and the shunt circuit around the high resistance winding 310 of the line relay 311 is again established, permitting the reënergization of the stepping relay 286, which again attracts its armature and closes the circuit to the magnet 228. It should be noted that while the current in the circuit, while the shunt around the high resistance winding 310 of line relay 311 is open, is insufficient to energize the relay 286, owing to the presence of the high resistance winding 310 there is still sufficient current through the high resistance winding 310 to maintain the line relay 311 energized.

Some time before the master sequence switch 451 reached its second position it closed the sequence switch contact 410 as is indicated by the characters ½, 1, 2, 2½ adjacent thereto upon the drawing. This closed a circuit from the battery 411 through the electromagnet of the speed changing clutch 68, sequence switch contact 410 and ground back to battery. This circuit energizes the clutch magnet and causes the shaft 57 to be coupled directly to the shaft 29, so that when the shaft 29 moves the shaft 57 will move and at the same rate of speed. Just before the sequence switch 451 reached its second position it closed, as is indicated, the sequence switch contact 412, and as it reached its second position it closed the sequence switch contact 413. The closure of the sequence switch contact 412 at the time the sequence switch contact 408 was opened completed a circuit from the battery 407, armature 406 and its front contact, sequence switch contact 412, stop magnet 43 and ground back to battery. The stop magnet 43 having been energized by the closure of this circuit attracts its armature 42 thereby closing a circuit through the contact springs 47, 48 which may be placed from the battery 417, master clutch magnet 25, contacts 47, 48 and ground back to battery. At the same time the energization of the magnet 43 has removed the stop formed by its armature from in front of the stop arm 40. The closure of the circuit through the master clutch magnet 25 couples the shaft 29 through the gearing shown with the constantly rotating shaft 15. The shafts 29 and 57 will now move together and at the same rate of speed being directly coupled by the energization of the clutch 68, and the sheave 76 will revolve owing to the energization of the individual clutch magnet 73. This will cause the metallic tape 92 to move and the brush carrier 88 will be elevated one step over a large group of terminals at a relatively high speed, in which step the contact brushes will pass over the contacts of an entire main group of trunk line terminals. The rotation of the shaft 29 has moved the disk 33 so that the shunt circuit around the high resistance winding 310 of the line relay 311 is opened by the contacts 35, 36 resting upon the insulated portion 418 of the disk. The rotation of the disk 34 with the shaft 29 has, however, closed a circuit to maintain the selecting relay 402 energized while the shunt circuit is open, by the closure of a circuit from the battery 419 through the contacts 37, 38 and the metallic portion of the disk 34, conductor 420, winding 416 of the selecting relay 402 and ground back to battery.

The opening of the shunt circuit around the high resistance winding 310 of the line relay 311 at the contacts 35, 36 has again, as before, caused the deënergization of the stepping relay 286, which again causes the deënergization of the magnet 228 allowing the segment 222 to complete a second step. As the shaft 29 continues to rotate a circuit is again made through the metallic portion of the disk 33 to close the shunt circuit around the high resistance winding 310 of the line relay 311 and upon a slightly further rotation of the shaft 29 the local energizing circuit of the selecting relay 402 through the winding 416 thereof is opened by the contacts 37, 38 coming upon the insulating portion 421 of the disk 34. If at this stage of the operation the high resistance 216 remains shunted by the armature 283 of the cut-off relay 282, the rotation of the shaft 29 and the consequent elevation of the brush carrier at the same relatively high speed will be continued until the brushes have passed over a second main group of contacts forming the terminals of the trunk lines, during which movement the segment 222 has been returned another step toward normal due to the operation of the various relays as described in connection with the first movement of the contact carrier. When, however, the segment 222 of the controller 221 has reached its normal condition due to the stepping operation controlled from the driving mechanism, which will be, in the case assumed, after four make and break impulses have been sent back from the selector over the connecting circuit, in the course of which the contact carrier has moved three relatively long steps and passed over three main groups of contact terminals, the contact 220 will be immediately opened and the cut-off relay 282 thereby deënergized. This will permit the retraction of the armature 283 which will open the shunt around the high resistance 216. When now the rotation of the shaft 29 has caused the opening of the local energizing circuit through the winding 416 of the selecting relay 402 and has again closed the shunt circuit around the high resistance winding 310 of the line relay 311, insufficient current will pass through the winding 401 of the selecting relay 402, due to the presence in the circuit of the high resistance 216, to maintain said selecting relay 402 energized and its armature 406 will be retracted closing a circuit from the battery 407, sequence switch contact 413, conductor 409, operating magnets 178 and 193 of the master sequence switch 451 and ground back to battery which will cause the sequence switch to move from its second position into its third position.

The movement of the sequence switch 451 into its third position opens among others the sequence switch contacts 410 and 412. The opening of the front contact of selecting relay 402 has caused the deënergization of the stop magnet 43 which, when the disk 39 is about to reach its normal position or position at rest allows the armature 42 to be retracted, opening the circuit to the master clutch magnet 25 at the contact springs 47, 48 and stopping the rotation of the shaft 29 by obstructing the movement of the stop arm 40 as well as by releasing the master clutch 13. The opening of the sequence switch contact 410 has, just as the sequence switch reached its third position, opened the circuit to the speed changing clutch 68. It should be noted that, as indicated, the sequence switch contact 410 does not open until just as the sequence switch reached its third position. These operations have brought the contact carrier temporarily to rest and the coöperative relations between the stopping disk 39, the stop arm 40 and the armature 42 of the stop magnet 43 have assured that the contact carrier has been stopped accurately in position, at the bottom of the main group in which the desired line is to be selected.

At the same time that the retraction of the armature 283 of relay 282 by including the high resistance 216 again in the selecting circuit brought the selector to a stop as just described, a circuit was closed from the battery 242, armature 284, and back contact, sender sequence switch contact 296, conductor 276, conductor 274, operating magnets 178 and 193 of the sender sequence switch 251 and ground back to battery. The energization of the magnets 178 and 193 of the sender sequence switch 251 thereupon cause the sequence switch to move from its first position to its second position. As the sequence switch is moving from its first to its second position the sequence switch contact 294 is closed and since the contacts 230 are closed, due to the fact that the controller 231 has been set, a circuit is established from battery 242, cutoff relay 282, conductor 218, sequence switch contact 294, conductor 281, contacts 230, and ground back to battery. This circuit energizes the cutoff relay 282 which immediately attracts its armature just before the sequence switch reaches its second position. The closing of the sequence-switch contact 294 between the first and second positions of the sender sequence switch is to prevent the establishment at this time of an energizing circuit for the sender sequence switch 251, through the armature 284, its back contact, and the sequence switch contact 296. The movement of the sender sequence switch 251 from first to second position has opened the sequence switch contacts 293 and 297, and has closed the sequence switch contact 298, and the magnet 238 is not in condition to be controlled by the stepping relay 286 over the circuit including battery 245, magnet 238, sequence switch contact 298, armature and contact 287, and ground back to battery.

The energization of the cutoff relay 282 as the sequence switch 251 reached its second position has again closed the shunt around the high resistance 216 at the armature 283. The closure of this shunt allows sufficient current to pass to again energize the selecting relay 402 over the circuit including the winding 401 of the selecting relay. The selecting relay 402 thereupon attracts its armature 406 and closes the circuit through its front contact, and the sequence switch contact 408, which is closed at this time since the master sequence switch is now in third position, to energize the operating magnets 178 and 193 of the master sequence switch 451. The master sequence switch 451 thereupon moves from its third position into its fourth position, opening the sequence switch contact 408 and closing the sequence switch contacts 412 and 413, the sequence switch contact 412 being closed just before the sequence switch reaches its fourth position as indicated upon the drawing. The sequence switch contact 412 in closing has again established a circuit from battery 407, through the armature 406 and its front contact to the stop magnet 43, which as before, upon being energized, attracts its armature 42 to permit the disk 39 to revolve and to close the circuit for the master clutch magnet 25 at the contacts 47, 48. The shaft 29 is thereupon again caused to revolve, driving with it, but at a speed only one-tenth as fast as before, the shaft 57, the speed-reducing clutch 68 being now unenergized and power is transmitted from the shaft 29 to the shaft 57 by means of the reducing gearing 51, 54 and the pawl and ratchet mechanism 58, 59. The brush carrier 88, mounted on the metallic tape 92, will therefore be moved, but at a relatively low speed and for each rotation of the shaft 29 will pass over but a single secondary group of trunk line terminals.

In the rotation of the shaft 29 the intermittent break and make of the shunt around the high resistance winding 310 of the line relay 311 is again produced as in the former selecting operations, there being a single break and make for each rotation of the shaft 29. Similarly the local energizing circuit for the winding 416 of the selecting relay 402 is made and broken at each revolution of the shaft 29 to maintain the selecting relay 402 energized until the shaft has rotated to the proper position. It will be noted, however, that in the second selecting operation no preliminary break and make of the shunt circuit by the sequence switch contact 404 occurred as was the case in the first selecting operation. This is for the reason that while the selection of a subsidiary group in a main group is from the bottom to the top of such group the selection of a particular line in a secondary group is from the top contacts in this group downwardly until such line is found. That is to say, if the line to be selected is, for example, in the third secondary group of the first main group, no long step of the brush carrier at the relatively high speed should be made, since three short steps at the relatively low speed will bring the brush carrier to the top of the third secondary group in such first main group. Similarly, in the case first assumed in which the line desired is located in the fourth main group and the third secondary group in such main group, three long steps at a relatively high speed were taken which caused the contact carrier to pass over three main groups and brought it to rest at the bottom of the fourth main group in which the line desired is located. Thereafter, three short steps at a relatively low speed will bring the contact carrier to the top of the third secondary group, and selection will be made from that point downwardly, contact being made with each succeeding set of terminals until the desired line in such secondary group is found. This method of operation involving a preliminary break and make of the circuit in shunt of the high resistance winding 310 of the line relay 311 at the beginning of the high speed selection of a main group of terminals is necessary in order that the controllers governing both high speed and low speed selection may be uniform in structure and operation, the preliminary break and make producing a full idle step of the main group controller 221 which idle step compensates for the fact that the high speed selection is to the bottom of the desired main group of terminals, whereas low speed selection is to the top of the desired secondary group of terminals.

While the contact carrier is passing over the three secondary groups to reach the top of the secondary group in which the line desired is to be found, the shaft 29 has been making three complete rotations and has caused the stepping relay 286 to energize and deënergize the magnet 238 to allow the segment 222 of the controller 231 to again come to normal position. This has immediately opened the contacts 230 and the cut-off relay 282 is thereupon again deënergized and releases its armatures. This has opened the shunt around the high resistance 216 and when the local energizing circuit for the winding 416 of the selecting relay 402 is again opened by the further movement of the commutator 34 insufficient current will pass from battery 241 over the selecting circuit and the winding 401 of the selecting relay 402 to maintain such relay energized and it will thereupon allow its armature 406 to retract. This opens the circuit to the stop magnet 43 which thereupon stops the rotation of the shaft 29 by the retraction of its armature 42 into the path of the stop arm 40, at the same time opening the circuit to the master clutch magnet 25. This brings the brush carrier to rest at the top of the secondary group in which the line desired is to be selected.

The retraction of the armature 406 has closed again an energizing circuit for the magnets 178 and 193 of the master sequence switch 451, which thereupon moves to its normal or rest position. In so doing, however, the master sequence switch has opened the contacts 412 and 413 and has closed the contact 408. The closing and opening of these contacts, however, has no further effect upon the operation of the selector, but merely places this much of the apparatus again in normal position to serve some other selector, or the same selector in connection with some subsequent call.

In passing, however, from the fourth position to normal position the master sequence switch 451 momentarily closes the master sequence switch contact 422. The closure of this contact establishes a circuit from the battery 423, sequence switch contact 422, conductor 336, individual sequence switch contact 324, conductor 337, operating magnets 178, 193 of the individual sequence switch 351 and ground back to battery. The energization of these magnets 178 and 193 causes the individual sequence switch to move from its first to its second position and in so doing it opens the sequence switch contacts 322, 323, 324, 325, 326, 327, 331 and closes the sequence switch contacts 338, 339 and 341, the sequence switch contact 338 being closed just before the sequence switch reaches its second position and being maintained closed in its second position. The individual mechanism has now released the master mechanism and is ready to test for and select an idle line in the secondary group, the top set of contacts of which the contact brushes are now in contact with.

When the cut-off relay 282 was deënergized, due to the opening of the contacts 230, and retracted its armatures, the circuit was again closed for the operating magnets 178 and 193 of the sender sequence switch 251 from the battery 242 through the armature 284, back contact and the sequence switch contact 296. This caused the sender sequence switch to move from its second position again into its normal position, and thereupon restored all of the sender sequence switch contacts to their normal condition.

When the individual sequence switch 351 in moving into its second position closed the contact 338 it established a circuit for the marginal test relay 342 over the test conductor 343 connected with the test contact 87 of the set of contact terminals upon which the contact brushes are now resting. At the distant end of the test conductor 343, and correspondingly with the test conductor of each of the other trunk lines, a battery 344 is connected through a resistance 345. The relation of the marginal test relay to the current from the battery 344 is so adjusted that if the line tested is idle, that is, if no other relay similar to the test relay 342 is connected to the test conductor 343, the current from the battery 344 passing through the test relay 342 will be sufficient to attract the armature 346 and having attracted it to maintain it attracted even though another relay should be connected to the test conductor 343. If on the other hand, the trunk line tested is already in use, a relay similar to the test relay 342 will be connected to the test conductor 343, and insufficient current will pass through the marginal test relay 342 to energize it.

Assuming first that the line tested is idle, a circuit will be established from the distant battery 344 through the resistance 345, test conductor 343, contact terminal 87, test brushes 91, conductor 347, sequence switch contact 338, marginal test relay 342 and ground back to battery. The marginal test relay will thereupon attract its armature 346 and upon the closure of the sequence switch contact 339 when the individual sequence switch reaches its second position a circuit will be closed from the battery 348, through sequence switch contact 339, armature 346 and its front contact, conductor 337, operating magnets 178 and 193 of the individual sequence switch 351 and ground back to battery. This will cause the individual sequence switch to move from its second position into its third position, and in so doing open the sequence switch contacts 309, 321, 339 and 341 and close the sequence switch contacts 331, 349, 350, 352 and 353. The sequence switch contacts 349 and 350 will, however, be closed just before the sequence switch reaches its third position and before the sequence switch contacts 309 and 338 are opened. A circuit will thereupon be established from the distant battery 344 through the resistance 345, test conductor 343, test contact terminal 87, test contact brushes 91, conductor 347, sequence switch contact 350, winding 334 of the line relay 311, sequence switch contact 349 and ground back to battery. This circuit will energize the line relay and maintain it energized after the sequence switch contact 309 has opened the circuit of the high resistance winding 310 of this relay. It should be noted that the relay 311 having been once energized will remain energized by current through the winding 310 from the battery 341 even though the shunt around the high resistance 216 be opened and it will only occur upon the opening of the sequence switch contact 309 and the energizing circuit of the winding 334 at the same time that the relay 311 will be deënergized. The closure of the sequence switch contacts 352 and 353 has completed the telephone transmission circuit 301, 302 to the contact brushes 89, 90 and thence through the contacts 85, 86 to the trunk conductors 303 and 304, selection and connection having been completed.

The return of the apparatus to normal is brought about by the opening of the circuit of the distant battery 344 connected with the test conductor 343 of the trunk line which may be accomplished in any suitable manner when connection has ceased. This deënergizes the relay 311 since the energizing circuit of both windings are now open which permits the retraction of its armature 312 and closes a circuit from the battery 313 through the armature 312 at its back contact, conductor 354, sequence switch contact 320, operating magnets 178, 193 of the individual sequence switch 351 and ground back to battery. The closure of this circuit causes the sequence switch 351 to move from its third position into its normal position, or position of rest, by which movement the sequence switch contacts 349, 350, 352, 353 and 320 are opened and the contacts 309, 319 and 390 are closed. The closure of the sequence switch contact 390 has established a circuit from the battery 332, sequence switch contact 390, contact 335 of the off-normal switch 316, conductor 329, release magnet 81, conductor 330, sequence switch contact 331 and ground back to battery. This circuit will be maintained closed, due to the closure of the contacts 335 of the off-normal switch, so long as the brush carrier is elevated from its normal position, and energizes the release magnet 81 which thereupon withdraws its armature 82 from engagement with the teeth 79 upon the sheave 76. The sheave 76 being now free to revolve, the individual clutch magnet having been heretofore deënergized by the opening of the sequence switch contact 327, allows the brush carrier 88 to descend of its own weight until it reaches its bottom or normal position, in which position the projection 317 upon the metallic tape 92 operates the off-normal switch 316 breaking the circuit to the release magnet 81 and all the parts are again in their normal position.

Assuming now that when the circuit to the marginal test relay 342 is closed by the movement of the individual sequence switch from its first to its second position that the trunk line connected to the top set of terminals of the subsidiary group of terminals selected, with which set of contacts the contact brushes 89, 90 and 91 are now in contact, is busy. In this case sufficient current from the battery 344 at the distant point will not pass through the marginal test relay 342 to energize it, this test relay 342 being shunted by a similar relay or resistance at some other point upon the multiple of this particular trunk line. The armature 346 of the test relay 342 will, therefore, remain retracted and as the sequence switch reaches its second position a circuit will be established from the battery 348, through the sequence switch contact 339, armature 346 and its back contact, conductor 356, conductor 329, release magnet 81, conductor 330, sequence switch contact 341, pulsator 357 and ground back to battery. The operation of the pulsator causes the release magnet 81 to be momentarily energized and immediately thereafter deënergized so that the armature 82 is attracted and withdrawn from engagement with the teeth 79 upon the sheave 76, but is again immediately released before more than one of the teeth 79 has passed thereunder. These teeth 79 are so adjusted that upon the movement of the sheave 76 the distance of one tooth the brush carrier 88 will descend from a position to coöperate with one set of contact terminals into position to coöperate and make contact with the next succeeding set of contact terminals therebelow. If now the trunk line connected to this set of contact terminals is also busy the marginal test relay will remain deënergized as before and the energizing circuit for the release magnet 81 through the pulsator 357 will remain established. A further vibration of the pulsator 357 will again momentarily energize the release magnet 81 and cause the contact brushes to make contact with still another set of contact terminals. This step by step release and test of the sets of contact terminals will continue until a set of terminals is tested which is idle, whereupon sufficient current will pass through the marginal test relay 342 to cause it to attract its armature 346 and establish a circuit through its front contact from the battery 348 to cause the individual sequence switch 351 to move into its third position as has been heretofore described. From this point in the operation until the return of the apparatus to normal, the operation is the same as has been already described in connection with the operation of the apparatus when the first line tested was idle.

The operation of the master clutch mechanism and the speed reducing mechanism with any other of the individual apparatus associated therewith would be precisely the same as with the individual apparatus shown in Fig. 2 and hereinbefore described, the points 461, 462, 463 and 464 indicating the converging points of the various circuits from the several individual mechanisms to the master mechanisms, and the dotted line x—x indicating the division between the master apparatus common to a plurality of selectors and the individual apparatus individual to a single selector.

The sequence switch contact 425 closed at all times except when the master sequence switch is in its rest or normal position establishes a circuit, when the relay 427 is deënergized, which passes from the battery 426, sequence switch contact 425, armature 428 and its back contact, conductor 409, operating magnets 178 and 193 of the master sequence switch 451 and ground back to battery. Upon the closure of this circuit the master sequence switch 451 will be moved into its normal or rest position no matter at what point in its operation the circuit was closed and in so moving will restore all of the apparatus associated with it to normal condition. However, to prevent this restoration under proper working conditions a circuit is provided for the relay 427 from the battery 313, armature 312 and its front contact, conductor 358, sequence switch contact 325, relay 427 and ground back to battery. The relay 427 will therefore be maintained energized under normal conditions during the entire operation of the master sequence switch 451, but immediately that the master sequence switch completes its cycle of operations, that is as it is returning to normal the momentary closure of the contact 422 causes the individual sequence switch 351 to move out of its first position and thereby opens the contact 325 in the circuit of the relay 427.

The utility of the relay 427 and its associated circuits is to insure the return of the apparatus both master and individual to normal condition through any abnormal failure of current over the circuit 301, 302 while selection is in progress. This is accomplished by having the circuit to the relay 427 controlled by the armature 312 of the relay 311. Should this relay 311 be deënergized at any time during selection, which deënergization could only be the result of some abnormal condition, the retraction of the armature 312 would open the circuit to the relay 427 causing it to restore the master mechanism to normal. At the same time the armature 312 would close at its rear contact a circuit from the battery 313, armature 312 and its rear contact, conductor 354, sequence switch contact 320, operating magnets 178 and 193 of the individual sequence switch 351 to ground back to battery. This circuit since the contact 320 is only open when the individual sequence switch is in normal or rest position will insure the return of the individual apparatus to normal condition. By these means the failure of current in the circuit 301, 302 cannot possibly tie up either the master mechanism and thereby the entire group of selectors associated therewith, or the particular individual mechanism of the selector associated with such circuit.

It should be understood that while the various sources of current herein shown are indicated as separate and independent all those which are of like polarity and potential and which are located in the same exchange may be, and preferably are, one and the same source of current.

I claim—

1. In combination, a plurality of switches each having a movable terminal and a plurality of fixed terminals arranged in groups, a driving means common to said switches, an interrupter actuated by said driving means for governing the movement of said switches, and means whereby said interrupter may be caused to operate once for each set of terminals traversed by said movable terminals or once for each terminal traversed.

2. In combination, a plurality of switches, a power shaft common to said switches, and an interrupter mounted on said shaft for governing the movement of said switches.

3. In combination, a plurality of switches, each having a movable brush, a common driving means for said switches, an individual driving means for each of said switches, a speed changing mechanism between said common and individual driving means, and an interrupter actuated by said driving means and common to said switches for governing the movement thereof.

4. In combination, a plurality of switches, a power shaft common to said switches, an individual clutch magnet for each of said switches, and an interrupter mounted on said power shaft and common to said switches for governing the movement thereof.

5. In a selector switch, stationary contacts, movable brushes for traversing said contacts, supports for said brushes, a power device, a common shaft for moving said supports, and speed changing mechanism associated with said power means whereby the relative speed of said shaft to said supports may be altered.

6. In a selector switch, stationary contacts, a brush for traversing said contacts, a power shaft, a support for said brush driven by said power shaft, and speed changing mechanism connecting said shaft to said support whereby selection is accomplished by separate movements of said brush in the same direction at different speeds.

7. In combination, selector switches, each having stationary contacts and a movable brush for traversing said contacts, a power device common to said switches, an individual driving means for each switch associated with said shaft, and speed changing mechanism associated with said shaft whereby the relative speed of said brushes to said device may be altered.

8. In a selector switch, stationary contacts, movable brushes for traversing said contacts, a power shaft common to said brushes, speed changing mechanism and means associated with said shaft whereby the relative speed of a brush to said shaft may be automatically altered during selection.

9. In a selector switch, stationary contacts, a movable brush for traversing said contacts, a driving means for moving said brush, and mechanism associated with said driving means whereby selection may be accomplished by a plurality of separate and distinct stages of movement of said brush in the same direction at different speeds.

10. In a telephone exchange system, the combination with a connecting circuit, of a selector switch having a movable part, a power shaft arranged to drive said movable part, reducing gearing between said shaft and said movable part, electromagnetic means arranged when operated to render ineffective said reducing gearing, and a sender controlling said electromagnetic means over said connecting circuit.

11. In a telephone exchange system, the combination with a connecting circuit, of a selector switch having a movable part, power means for driving said movable part, an electromagnetic clutch controlling the operative relation of said power means and said movable part, speed reducing mechanism associated with said power means, electromagnetic means arranged when operated to render said mechanism ineffective, and a sender controlling said clutch and said electromagnetic means over said connecting circuit.

12. In combination, a plurality of switches, each having stationary contacts arranged in groups and a movable brush for traversing said contacts, a power shaft, a common operating shaft for said switches, and speed changing mechanism interconnecting said shafts whereby each revolution of said power shaft will cause a brush to travel over a single contact or over a group of contacts.

In witness whereof, I hereunto subscribe my name this 9th day of August A. D., 1912.

EDWARD B. CRAFT.

Witnesses:
ELLA EDLER,
WALTER FREDERICK HOFFMAN.